United States Patent
Kim et al.

(10) Patent No.: US 7,834,844 B2
(45) Date of Patent: Nov. 16, 2010

(54) ELECTRONIC INK DISPLAY DEVICE AND DRIVING METHOD

(75) Inventors: Chang Yeon Kim, Anyang-si (KR); Dae Won Kim, Seoul (KR)

(73) Assignee: LG. Display Co., Ltd., Seoul (KR)

( * ) Notice: Subject to any disclaimer, the term of this patent is extended or adjusted under 35 U.S.C. 154(b) by 886 days.

(21) Appl. No.: 11/646,707

(22) Filed: Dec. 27, 2006

(65) Prior Publication Data
US 2007/0273956 A1 Nov. 29, 2007

(30) Foreign Application Priority Data
May 24, 2006 (KR) .................. 10-2006-0046528

(51) Int. Cl.
*G09G 3/34* (2006.01)
(52) U.S. Cl. ...................... 345/107; 359/296
(58) Field of Classification Search ............ 345/107
See application file for complete search history.

(56) References Cited

U.S. PATENT DOCUMENTS

| | | | |
|---|---|---|---|
| 6,486,866 B1 * | 11/2002 | Kuwahara et al. ........... | 345/107 |
| 6,574,034 B1 | 6/2003 | Lin et al. | |
| 6,731,259 B2 * | 5/2004 | Yer et al. ..................... | 345/89 |
| 6,961,047 B2 * | 11/2005 | Katase ........................ | 345/107 |
| 7,511,877 B2 * | 3/2009 | Kim et al. ................... | 359/296 |
| 2003/0132908 A1 | 7/2003 | Herb | |
| 2006/0114207 A1 * | 6/2006 | Lee et al. .................... | 345/89 |
| 2006/0139310 A1 * | 6/2006 | Zehner et al. .............. | 345/107 |

FOREIGN PATENT DOCUMENTS

| | | |
|---|---|---|
| JP | 2000-0194020 | 7/2000 |
| JP | 2002-365670 | 12/2002 |
| JP | 2006-058901 | 3/2006 |
| WO | WO03/032070 | 4/2003 |

OTHER PUBLICATIONS

Combined Search and Examination Report dated Apr. 23, 2007 for corresponding Great Britain Patent Application No. GB0624955.1.
Office Action issued in corresponding Japanese Patent Application No. 2006-347567; mailed Mar. 10, 2010.

* cited by examiner

*Primary Examiner*—David L Lewis
(74) *Attorney, Agent, or Firm*—Brinks Hofer Gilson & Lione

(57) ABSTRACT

An electronic ink panel comprises an electronic ink layer, a first substrate and a second substrate. The electronic ink layer includes first to third particles responding to voltages in different level ranges. The first substrate has a first electrode facing one surface of the electronic ink layer. The second substrate has a plurality of second electrode patterns of a size of a pixel region. The second substrate faces the other surface of the electronic ink layer.

12 Claims, 7 Drawing Sheets

ELECTRONIC INK DISPLAY DEVICE AND DRIVING METHOD

PRIORITY CLAIM

This application claims the benefit of Korean Patent Application No. 10-2006-0046528, filed on May 24, 2006, the disclosure of which is incorporated herein by reference in its entirety.

BACKGROUND

1. Technical Field

The present invention relates to an electronic ink display device and a driving method. More particularly, the present invention relates to an electronic ink display device capable of displaying colors without a color filter and a method for driving the same.

2. Related Art

Cathode ray tubes are used as a monitor of a measurement instrument and an information terminal device such as a TV. Due to weight and size, cathode ray tubes are replaced with flat panel display devices such as an Liquid Crystal Display ("LCD") device, a Plasma Display Panel ("PDP"), and an Electro Luminescent Display ("ELD"), an electronic ink display device.

Electronic ink display devices called "a DPD (Digital Paper Display) device" may be manufactured at a low cost and need lower energy. Electronic ink display devices may have no separate backlight unit and have a wide viewing angle. Electronic ink display devices may be bent repeatedly and preserve resolution and contrast despite repetitive bending. Electronic ink display devices may be for use with a portable computer, an electronic newspaper, a smart card, etc. Electronic ink display devices may replace traditional print media such as books, newspapers, and magazines.

Electronic ink used in electronic ink display devices includes particles. The particles are floatably included in a capsulated fluid. The particles have a negative or positive charge so that phoresis can be performed to the particles. Accordingly, electronic ink display devices display an image by applying electric fields to the electronic ink and regulating the phoresis of the particles in the electronic ink.

FIG. 1 is a cross-sectional view illustrating an electronic ink display device which uses an electronic ink panel 100. The electronic ink panel 100 includes first and second substrates 2 and 4 facing each other. A middle electronic ink layer 10 is interposed between the first and second substrates 2 and 4.

Gate electrodes 3 and gate wires (not shown) are formed on the second substrate 4. The gate wires are electrically connected to the gate electrodes 3. A gate insulation layer 5 is formed on the second substrate 4 having the gate electrodes 3 and the gate wires. Channel layer patterns 7 are formed at portions corresponding to the gate electrodes 3 on the gate insulation layer 5. The channel layer patterns 7 are formed by disposing a semiconductor material layer on the gate insulation layer 5 and patterning the semiconductor material layer. Source and drain electrodes 9A and 9B are separated from each other and formed on the surface of each channel layer pattern 7. Data wires (not shown) are formed together with the source and drain electrodes 9A and 9B. The data wire is electrically connected to the source electrode 9A. A protection layer 11 having contact holes is formed on and above the entire surface of the second substrate 4. The source and drain electrodes 9A and 9B are formed. Each of the contact holes exposes a portion of the surface of the corresponding drain electrode 9B. Second electrode patterns 8 are electrically connected to the drain electrodes 9B and are formed on the protection layer 11. Each of the second electrode patterns 8 is located in a sub-pixel region divided by the gate wires and the data wires.

A black matrix is formed on the first substrate 2. The surface of the first substrate 2 is divided into a plurality of sub-pixel regions by the black matrix 19. A color filter 18 is formed on the surface of the first substrate 2 which is exposed through the black matrix 19. The color filter 18 includes sub-color filters 18A, 18B, and 18C of red, green, and blue. A first electrode 6 is formed on the surfaces of the sub-color filters 18 and the black matrix 19.

The first and second substrate 2 and 4 are disposed on both surfaces of the electronic ink layer 10 so that the first electrode 6 and the second electrode patterns 8 face each other. In other words, the electronic ink layer 10 is located between the first electrode 6 and the second electrode patterns 8. The electronic ink layer 10 includes a binder film 12 in which a micro-capsulated ink capsule 14 is dispersed and contained. The binder film 12 is formed of a polymer. The ink capsule has a diameter of approximately a few hundred micrometers. The ink capsule 14 includes a fluid 16 which is filled with one of an organic material and an inorganic material. At least one kind of electrified particles 20 is injected into the fluid of the ink capsule 14. Phoresis is performed with respect to the particles in response to an electric field applied between the first electrode 6 and the second electrode pattern 8. A color image may be displayed on the first substrate 2 in which the color filter 18 is formed.

The particles 20 include white first particles 22 of a positive charge and black second particles 24 of a negative charge. Phoresis is performed with respect to the first and second particles 22 and 24 according to the electric fields between the first electrode 6 and the second electrode patterns 8. An image corresponding to the gradation of white and black colors may be displayed on the electronic ink layer 10. As the black and white image on the electronic ink layer 10 is projected to the first substrate 2 having the color filter 18, a color image appears on the electronic ink panel (i.e. the first substrate 2).

FIGS. 2A to 2C show the phoresis state of the first and second particles 22 and 24 of FIG. 1 according to electric fields. FIG. 2A shows that upon application of a voltage −V of the negative polarity to the first electrode 6 and a voltage +V of the positive polarity to the second electrode pattern 8, the white first particles 22 of a positive charge are concentrated to the first electrode 6. At the same time, the black second particles 24 of a negative charge are concentrated to the second electrode 8. The difference between the voltage −V of the negative polarity and the voltage +V of the positive polarity is set large enough to perform phoresis with respect to the first and second particles 22 and 24. Due to the white color of the first particles 22 concentrated to the first electrode 6, a large amount of light from outside is reflected toward the color filter 18. Sub-pixels of red, green, and blue of the highest gradation are displayed on the first substrate 2 according to the sub-color filters 18A, 18B, and 18C.

In FIG. 2B, upon application of a voltage +V of the positive polarity to the first electrode 6 and a voltage −V of the negative polarity to the second electrode pattern 8, the white first particles 22 of a positive charge are concentrated to the second electrode 8 and the black second particles 24 of a negative charge are concentrated to the first electrode 6. The black color of the second particles 24 concentrated to the first electrode 6 may absorb almost all the light from outside. Therefore, sub-pixels of red, green, and blue of the lowest gradation are displayed on the first substrate 2 according to the sub-color filters 18A, 18B, and 18C.

FIG. 2C shows that voltages +V of the positive polarity, voltages −V of the negative polarity or voltages of very small voltage differences are applied to all of the first electrode 6 and the second electrode pattern 8. In this case, the first and second particles 22 and 24 are concentrated to a central portion between the first electrode 6 and the second electrode pattern 8 by the attractive force. About a half of the light from outside is reflected toward the color filter 18 by the white color of the first particles 22 and the black color of the second particles 24. Therefore, sub-pixels of red, green, and blue which have a middle gradation are displayed on the first substrate 2 according to the sub-color filters 18A, 18B, and 18C.

As mentioned above, the related art electronic ink panel includes the color filter 18 to display a color image. The color filter 18 reflects some of the light to be transmitted and may deteriorate the optical efficiency of the electronic ink panel. The color filter may increase the thickness of the electronic ink panel and complicate the manufacturing process of the electronic ink panel. Accordingly, there is a need of an electronic ink panel that overcomes drawbacks of the related art panel.

SUMMARY

In one embodiment, an electronic ink panel includes a first substrate having a first electrode and a second substrate having a plurality of second electrode patterns which faces the first electrode. The second electrode patterns cover a pixel region. The electronic ink panel further includes an electronic ink layer interposed between the first and the second substrates. The electronic ink layer includes a plurality of particles. Each of the particles responds to a voltage in a different level range.

In the other embodiment, an electronic ink display device includes an electronic ink panel, a gamma voltage generating section and a driving unit. The electronic ink panel includes an electronic ink layer and substrates. The electronic ink layer includes particles of red, green, and blue colors which perform phoresis in response to voltages in different level ranges. The substrates includes wire patterns dividing and driving the electronic ink layer to sub-pixel regions. The gamma voltage generating section generates first to third gamma voltage sets. The first to third gamma voltage sets have at least two gradation voltages in level ranges and correspond to the red, green, and blue particles. The driving unit drives the wire patterns on the electronic ink panel so that one of the red, green, and blue particles performs phoresis in one of the sub-pixel regions using the first to third gamma voltage sets in response to a data steam. The data stream includes sub-pixel data of red, green, and blue.

In another embodiment, a method for driving an electronic ink display device is provided. First, second and third gamma voltage sets having at least two gradation voltages in different voltage level ranges are generated. The first, the second and the third gamma voltage sets are input to a data driver. At the data driver, sub-pixel data of red, green, and blue in the form of a data stream are converted to sub-pixel data voltages of red, green, and blue in the form of analog by using the first, the second and the third gamma voltage sets. The sub-pixel data voltages of red, green, blue are supplied to wire pattern which divides an electronic ink panel to the sizes of sub-pixel regions. The electronic ink panel includes particles of red, green, and blue colors. The first, the second and the third gamma voltage sets have at least two gradation voltages in level ranges corresponding to the red, green and blue particles. Phoresis of the red, green, and blue particles are performed in response to voltages in different level ranges in the sub-pixel regions.

It is to be understood that both the foregoing general description and the following detailed description of the present invention are exemplary and explanatory, and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF PREFERRED EMBODIMENTS

Hereinafter, preferred embodiments according to the present invention will be described with reference to the accompanying drawings.

Figure 1:
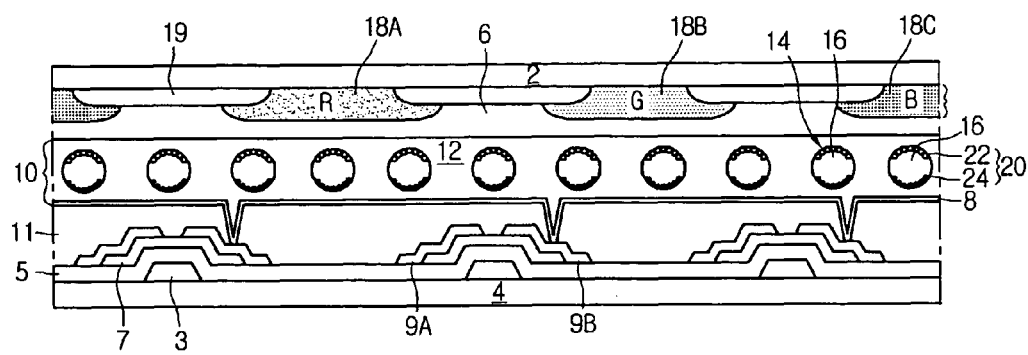
FIG. 1 is a cross-sectional view showing an electronic ink panel of a related art electronic ink display device.
Figure 2A:
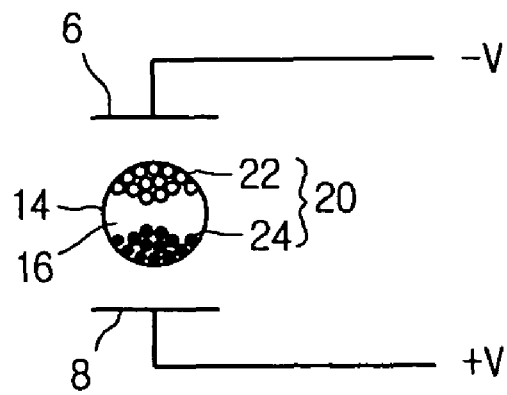
FIGS. 2A to 2C are circuit diagrams illustrating the electrical phoresis state of the electronic ink panel in FIG. 1.
Figure 2B:
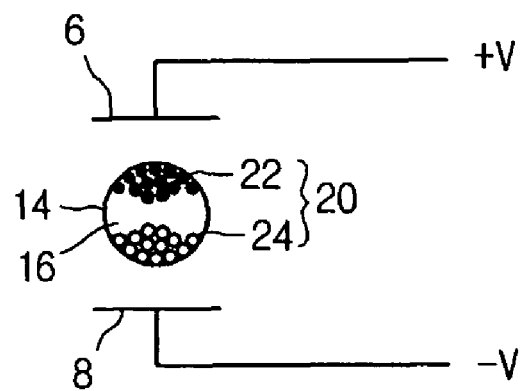
Figure 2C:
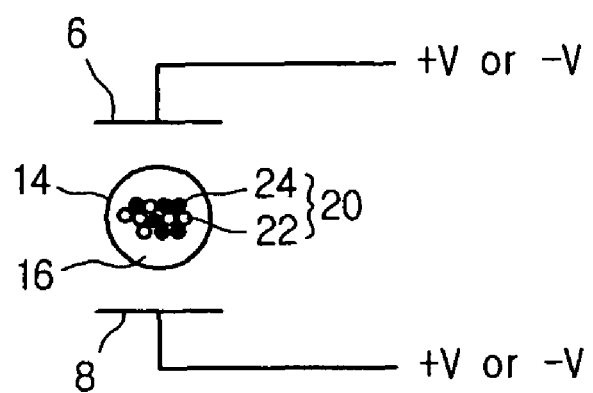
Figure 3:
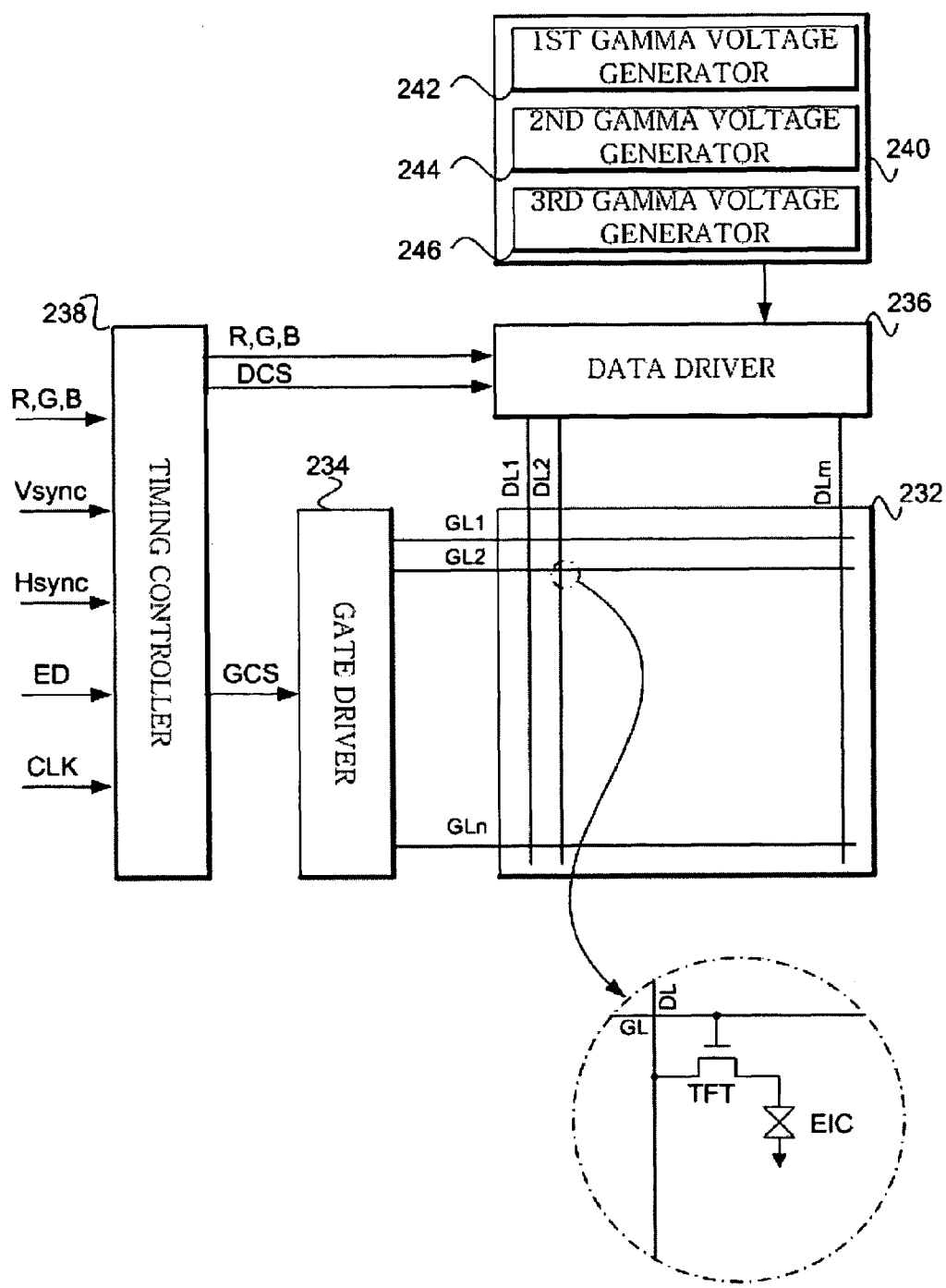
FIG. 3 is a block diagram illustrating an electronic ink display device according to a preferred embodiment.

FIG. 3 is a block diagram illustrating an electronic ink display device according to a preferred embodiment. The electronic ink display device 200 includes an electronic ink panel 232 displaying a color image. A plurality of gate lines GL1 to GLn and a plurality of data lines DL1 to DLm cross each other on the electronic ink panel 232. The display region of the electronic ink panel 232 is divided into a plurality of sub-pixel regions by the gate lines GL1 to GLn and the data lines DL1 to DLm. A sub-pixel is formed in each of the sub-pixel regions. The sub-pixel includes a thin film transistor TFT connected to the corresponding gate line GL, the corresponding data line DL, and the corresponding electronic ink cell (EIC). The thin film transistor TFT switches a sub-pixel voltage which is to be transferred from the corresponding data line DL to the corresponding electronic ink cell EIC in response to a gate signal on the corresponding gate line GL.

Figure 4:
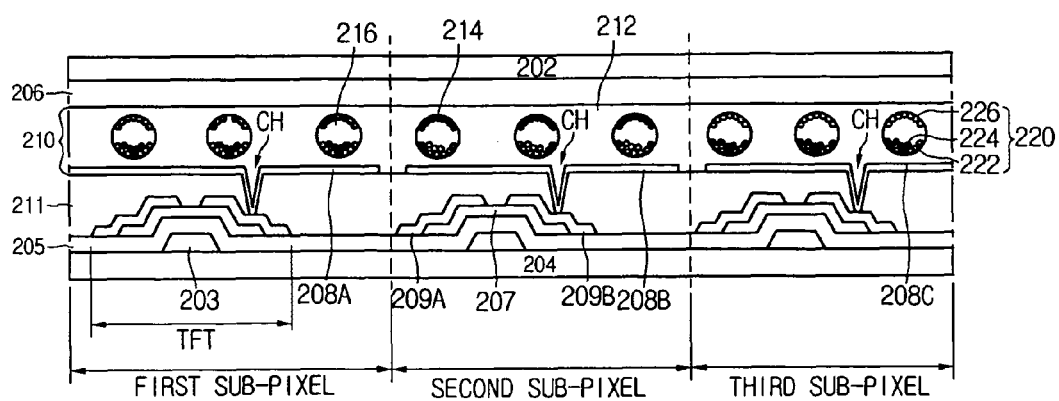
FIG. 4 is a cross-sectional view illustrating the electronic ink panel of FIG. 3.

FIG. 4 is a cross sectional view illustrating the electronic ink panel 232. As shown in FIG. 4, the electronic ink panel 232 has the plurality of sub-pixels. The electronic ink panel 232 includes first and second substrates 202 and 204 facing each other with the electronic ink layer 210 disposed there between. Substrates formed of a transparent insulation material (e.g. one of glass and plastic) may be used as the first and second substrates 202 and 204. Preferably, plastic substrates may be used as the first and second substrates 202 and 204 because they may be bent or deformed repeatedly.

Gate electrodes 203 and gate lines GL (not shown) are formed on the second substrate 204. The gate lines GL are electrically connected to the gate electrodes 203. A gate insulation layer 205 is formed on the second substrate 204 having the gate electrodes 203 and the gate lines GL. Channel layer patterns 207 are formed at portions corresponding to the gate electrodes 203 on the gate insulation layer 205. The channel layer patterns 207 are formed by disposing a semiconductor material layer on the gate insulation layer 5 and patterning the semiconductor material layer. Source and drain electrodes 209A and 209B separated from each other are formed on a surface of each of the channel layer patterns 207. Data lines DL (not shown) are formed together with the source and drain electrodes 209A and 209B. The data lines DL are electrically connected to the source electrode 209A. The gate electrode 203, the channel layer pattern 207, and the source and drain electrodes 209A and 209B constitute the thin film transistor TFT of FIG. 3.

A protection layer having contact holes CH is formed on the entire surface of the second substrate 204. The source and drain electrodes 209A and 209B are disposed on the second substrate 204. Each of the contact holes CH exposes a portion of a surface of the drain electrode 209B. Second electrode patterns 208 electrically connected to the drain electrodes 209B are formed on the protection layer 211. Each of the second electrode patterns 208 is located in a sub-pixel region divided by the gate line and the data line DL to be used as a sub-pixel electrode. Each of the second electrode patterns 208 forms a sub-pixel together with the corresponding thin film transistor TFT. More particularly, the first pixel electrode 208A and the thin film transistor TFT connected to the first pixel electrode 208A form a first sub-pixel and the second pixel electrode 208B and the thin film transistor TFT connected to the second pixel electrode 208B form a second sub-pixel. Further, the third pixel electrode 208C and the thin film transistor TFT connected to the third pixel electrode 208C form a third sub-pixel. In addition, each of the second electrode patterns 208 (i.e. the first to third pixel electrodes 208A to 208C) constitutes an electronic ink cell (EIC) together with the electronic ink layer portion at an upper portion thereof.

A first electrode 206 is formed on the entire surface of the first substrate 202. The first electrode 206 is formed of a conductive material (e.g. ITO) like the second electrode patterns (i.e. the first to third pixel electrodes 208A to 208C). The first and second substrates 202 and 204 are disposed at both sides of the electronic ink layer 210, respectively, with the first electrode 206 and the second electrode patterns 208 facing each other. The electronic ink layer 210 includes a binder film 212 in which ink capsules 214 are dispersed and contained. The binder film 212 fixes the ink capsules 214 so that the ink capsules 214 may not move and function as a cross-linker for electrical and physical division. The binder film 212 is formed of one of dielectric materials such as soluble, water-dispersed, liposoluble, thermosetting, and thermoplastic polymers and/or photo-polymerizable polymers.

The ink capsule 214 includes a fluid 216 and particles 220. The ink capsule 214 is formed of an organic material capable of protecting the fluid 216. The fluid 216 is formed of a transparent and translucent material having the viscosity that enables phoresis of the particles 220. The fluid 216 has a high resistance. Alternatively, the fluid 216 may be formed of an inorganic material. In other embodiments, a mixture fluid having at least two mixed materials may be used as the fluid 216. Alternatively, or additionally, the fluid 216 may be dyed in red, green, and blue according to the sub-pixels.

The particles 220 injected into the ink capsule 214 include first to third groups of particles 222, 224, and 226. The first to third groups of particles 222, 224, and 226 are injected into the ink capsule 214 together with the fluid 216. The red first group of particles 222 of a positive charge, the green second group of particles 224 of a positive charge, and the blue third group of particles 226 may be injected into the ink capsule 214. Alternatively, the first group of particles 222 may be red and of a negative charge, the second group of particles 224 may be green and of a negative charge, and the third group of particles 226 may be blue and of a negative charge.

All of the particles 222 to 226 react only to voltages in different level ranges regardless of its positive or negative charges. The particles 222 to 226 perform phoresis toward the first electrode 206 used as the common electrode or the second electrode pattern 208 used as the pixel electrode in response to voltages in different level ranges.

The particles 222 perform phoresis toward the first electrode 206 when a voltage in a low level range is applied between the first electrode 206 and the second electrode pattern 208 to display the red color of the gradation corresponding to the voltage. The particles 224 perform phoresis toward the first electrode 206 when a voltage in a middle level range is applied between the first electrode 206 and the second electrode pattern 208 to display the green color of the gradation corresponding to the voltage. The particles 226 perform phoresis toward the first electrode 206 when a voltage in a high level range is applied between the first electrode 206 and the second electrode pattern 208 to display the blue color of the gradation corresponding to the voltage.

A sub-pixel data voltage in a low level range may be supplied between the first electrode 206 and one of the second electrode patterns 208, e.g. a first sub-pixel electrode 208A. A sub-pixel data voltage in a middle level range may be supplied between the first electrode 206 and another of the second electrode patterns 208, e.g. a second sub-pixel electrode 208B. A sub-pixel data voltage in a high level range may be supplied between the first electrode 206 and the other of the second electrode patterns 208, e.g. a third sub-pixel electrode 208C. In this case, the phoresis of the red particles 222 is performed in the ink capsules 214 at an upper portion of the first pixel electrode 208A, the phoresis of the green particles 224 is performed in the ink capsules 224 at an upper portion of the second pixel electrode 208B, and the phoresis of the blue particles 226 is performed in the ink capsules 214 at an upper portion of the third pixel electrode 208C. Therefore, the region of the first pixel electrode 208A may be driven as a red sub-pixel displaying the red color of a plurality of gradations, the region of the second pixel electrode 208B as a green sub-pixel displaying the green color of a plurality of gradations, and the region of the third pixel electrode 208C as a blue sub-pixel displaying the blue color of a plurality of gradations. One color pixel displaying various colors includes the red, green, and blue sub-pixels.

By responding to voltages of different levels, one of the red, green, and blue particles selectively perform the phoresis. One of the red, green and blue particles may be used as a sub-pixel. Accordingly, the electronic ink panel 232 may display the color image without a color filter. The size of the electronic ink panel 232 may be slimmer by removing the color filter. The manufacturing process may be simplified.

In FIG. 3, the electronic ink display device 200 includes a gate driver 234 for driving the plurality of gate lines GL1 to GLn on the electronic ink panel 232 and a data driver 236 for driving the plurality of data lines DL1 to DLm on the electronic ink panel 232. The electronic ink display device 200 also has a timing controller 238 for controlling the gate driver 234 and the data driver 236 and a gamma voltage generating section 240 for supplying a gamma voltage to the data driver 236.

The gate driver 234 supplies a plurality of scan signals to the plurality of gate lines GL1 to GLn in response to the gate control signal supplied from the timing controller 238. The plurality of scan signals has 'enable' pulses sequentially shifted by a predetermined period (e.g. a period corresponding to the period of horizontal synchronous signals). Accordingly, the plurality of gate lines GL1 to GLn are sequentially enabled by the plurality of scan signals during such periods.

The data driver 236 supplies pixel data voltages to the plurality of data lines DL1 to DLm in response to data control signals supplied from the timing controller 238. The data driver 236 inputs red, green, and blue sub-pixel data by one line from the timing controller 238. The data driver 236 converts the sub-pixel data of red, green, and blue of one line to analog sub-pixel data voltages using the gamma voltage sets from the gamma voltage generating section 240. The sub-pixel data voltages of red, green, and blue of one line, which is converted by the data driver 236, are supplied to the plurality of data lines DL1 to DLm on the electronic ink panel 232.

The timing controller 238 generates a gate control signal to be supplied to the gate driver 234, a data control signal to be supplied to the data driver 236, a data enable signal DE and a clock signal. The timing controller 238 generates the gate control signal and the data control signal by using a vertical/horizontal synchronous signal Vsync/Hsync supplied from a system (not shown). Further, the timing controller 238 rearranges the data stream of the red, green, and blue sub-pixel data supplied form an external system by one line. The timing controller 238 supplies the rearranged red, green, and blue sub-pixel data to the data driver 236 by one line.

The gamma voltage generating section 240 supplies the first to third gamma voltage sets pertaining to different level ranges to the data driver 236. The gamma voltage generating section 240 includes first to third gamma voltage generators 242 to 246. The first gamma voltage generator 242 generates a first gamma voltage set of a first level range (for example, a low level range) for performing phoresis to the first particle 222 contained in the ink capsule 214 of the electronic ink panel 232. The second gamma voltage generator 244 generates a second gamma voltage set of a second level range (for example, a middle level range) for performing phoresis to the second particle 224 contained in the ink capsule 214 of the electronic ink panel 232. The third gamma voltage generator 246 generates a third gamma voltage set of a third level range (for example, a high level range) for performing phoresis to the third particle 226 contained in the ink capsule 214 of the electronic ink panel 232.

The first to third gamma voltage sets are input to the data driver 236. The data driver 236 converts the red sub-pixel data of the sub-pixel data of one line to sub-pixel data voltages pertaining to a low level range by the first gamma voltage set. The sub-pixel data voltages in the low level range are supplied to the first pixel electrode 208A and only the red first particles 222 of the particles 222 to 226 in the ink capsule 214 at an upper portion of the first pixel electrode 208A may be concentrated to the first electrode 206 to display the red color of the gradation corresponding to the logic values of the red sub-pixel data. The data driver 236 converts the green sub-pixel data of the sub-pixel data of one line to sub-pixel data voltages pertaining to a middle level range by the second gamma voltage set. The sub-pixel data voltages in the middle level range are supplied to the second pixel electrode 208B so that only the green second particles 224 of the particles 222 to 226 in the ink capsule 214 at an upper portion of the second pixel electrode 208B may be concentrated to the first electrode 206 to display the green color of the gradation corresponding to the logic values of the green sub-pixel data. The data driver 236 converts the blue sub-pixel data of the sub-pixel data of one line to sub-pixel data voltages pertaining to a high level range by the third gamma voltage set. The sub-pixel data voltages in the high level range are supplied to the third pixel electrode 208C so that only the blue third particles 226 of the particles 222 to 226 in the ink capsule 214 at an upper portion of the third pixel electrode 208C may be concentrated to the first electrode 206 to display the blue color of the gradation corresponding to the logic values of the blue sub-pixel data. Accordingly, a color image corresponding to the sub-pixel data stream of one frame is displayed on the electronic ink panel.

As mentioned above, in the electronic ink display device 200, the red, green, and blue sub-pixel data voltages in different level ranges are supplied to the data lines of the electronic ink panel 232. The electronic ink panel 232 contains the red, green, and blue particles responding voltages in different level ranges. One of the red, green, and blue colors of the gradation corresponding to the logic value of the sub-pixel data is displayed by selectively performing phoresis with respect to one of the red, green, and blue particles on the electronic ink panel according to the sub-pixel. Consequently, the electronic ink display device may display a color image corresponding to the sub-pixel data stream of one frame on the electronic ink panel without a color filter. In addition, the electronic ink display device 200 may be slimmer because the thickness of the electronic ink panel becomes thinner.

Figure 5A:
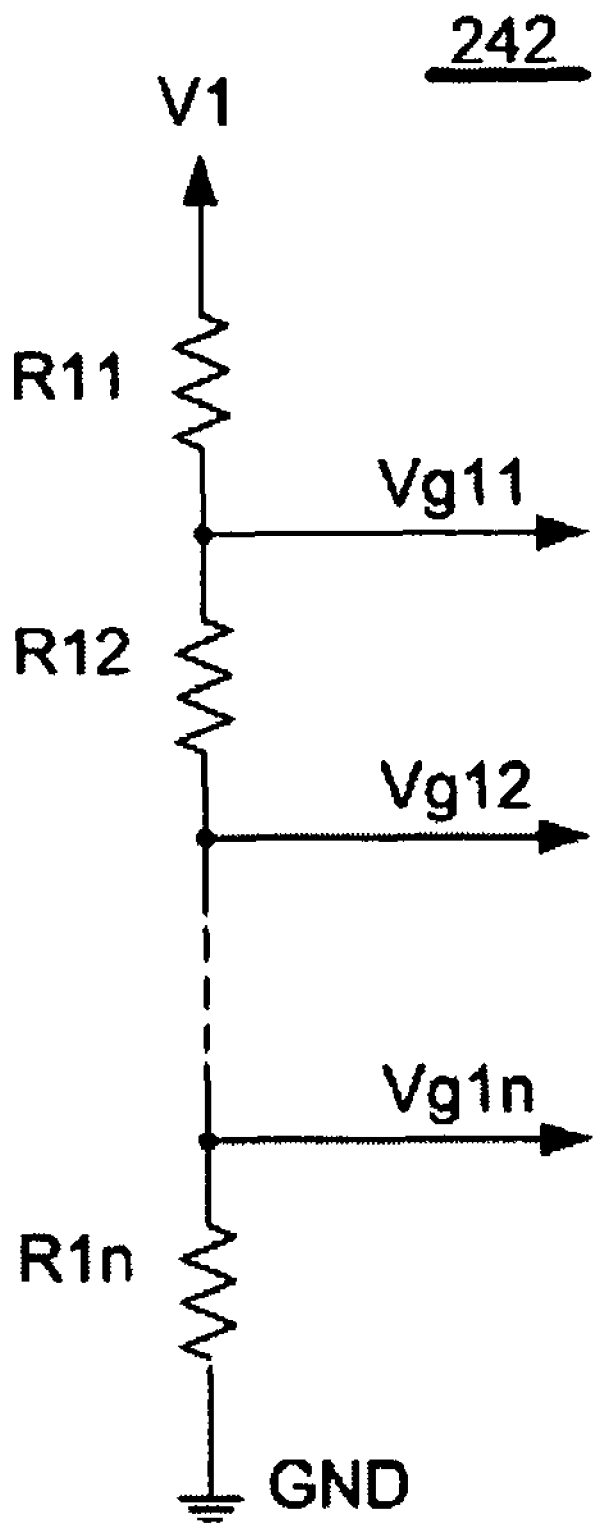
FIGS. 5A to 5C are one example of circuit diagrams illustrating the first to third gamma voltage generators of FIG. 3.
Figure 5B:
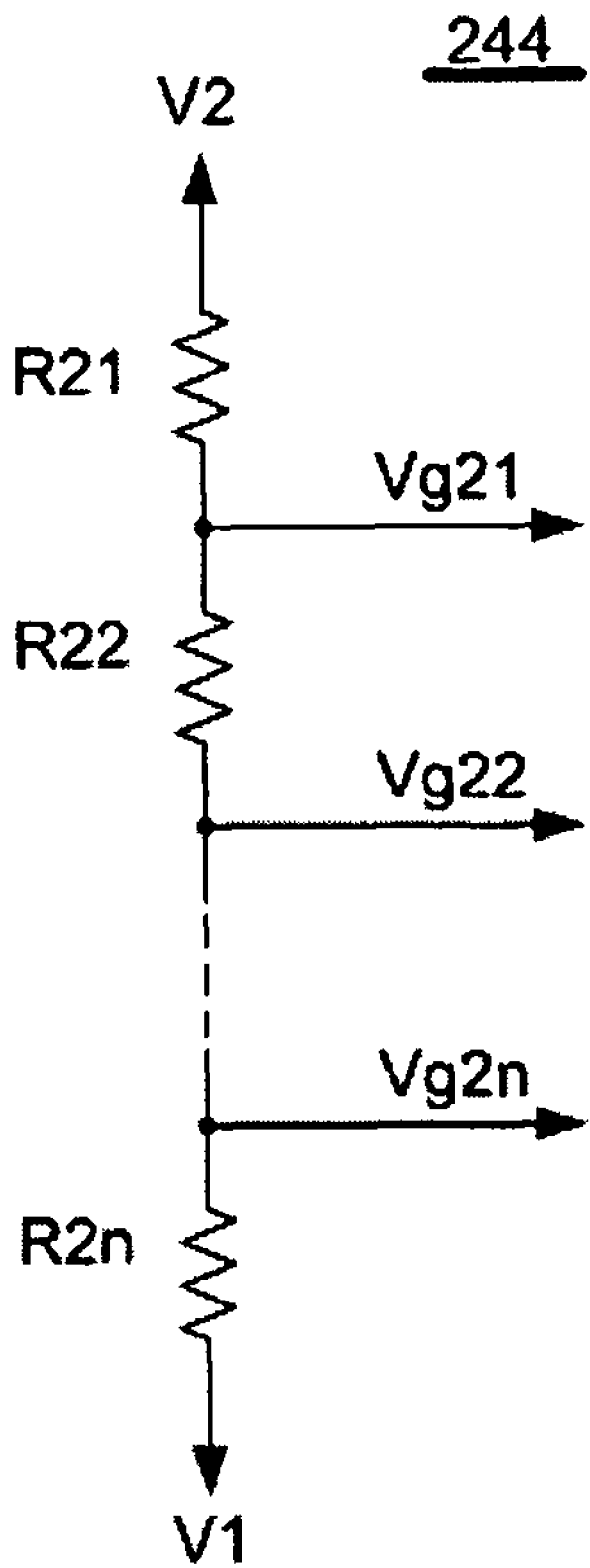
Figure 5C:
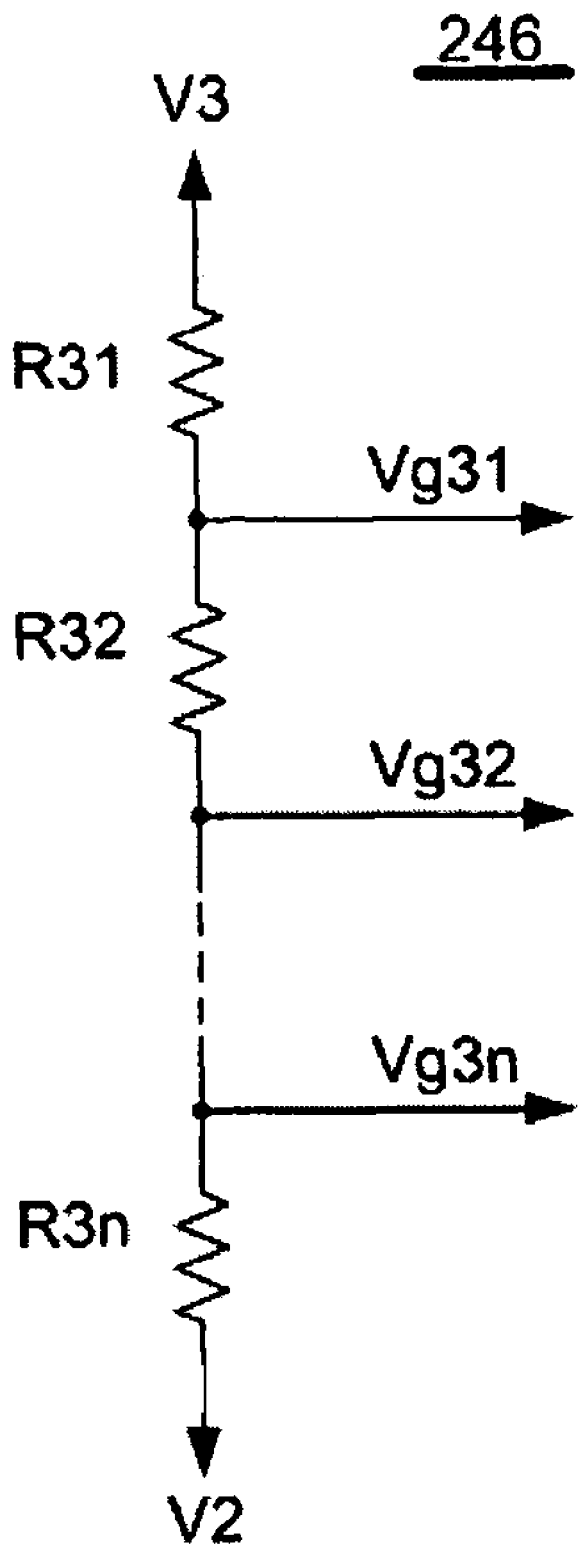

FIGS. 5A to 5C are one example of circuit diagrams illustrating the first to third gamma voltage generators 242, 244, and 246 of FIG. 3. FIG. 5A shows that the first gamma voltage generator 242 includes a first resistor string including a plurality of resistors R11 to R1n. The plurality of resistors R11 to R1n are connected in series between input lines of a first power source voltage V1 and the base voltage GND. The divided voltages Vg11, Vg12, . . . Vg1n generated at connection points between two neighboring resistors such as R11 and R12, R13 and R14, etc. are supplied to the data driver 236 as a first gamma voltage set. The voltages Vg11, Vg12, . . . Vg1n divided by the two neighboring resistors R11 to R1n have different voltage levels in a low level range between the first power source voltage V1 and the base voltage.

The second gamma voltage generator 244 shown in FIG. 5B includes a second resistor string including a plurality of resistors R21 to R2n. The plurality of resistors R21 to R2n included in the second resistor string are connected in series between input lines of a first power source voltage V1 and a second power source voltage V2. The divided voltages Vg21, Vg22, . . . Vg2n generated at connection points between the plurality of resistors R21 to R2n are supplied to the data driver 236 as a second gamma voltage set. The voltages Vg21, Vg22, . . . Vg2n divided by the plurality of resistors R21 to R2n have different voltage levels in a middle level range between the first power source voltage V1 and the second power source voltage V2. The first power source voltage V1 supplied to the second gamma voltage generator 244 of FIG. 5B has the same voltage level of that of the first power source voltage V1 supplied to the first gamma voltage generator 242 of FIG. 5A.

As shown in FIG. 5C, the third gamma voltage generator 246 includes a third resistor string including a plurality of resistors R31 to R3n. The plurality of resistors R31 to R3n included in the third resistor string are connected in series between input lines of a third power source voltage V3 and a second power source voltage V2. The divided voltages Vg31, Vg32, . . . , Vg3n generated at connection points between the two neighboring resistors among R31 to R3n are supplied to the data driver 236 as a third gamma voltage set. The voltages Vg31, Vg32, . . . Vg3n divided by the plurality of resistors R31 to R3n have different voltage levels in a high level range between the third power source voltage V3 and the second power source voltage V2. The second power source voltage V2 supplied to the third gamma voltage generator 246 of FIG. 5C has the same voltage level as that of the second power source voltage V2 supplied to the second gamma voltage generator 242 of FIG. 5B.

Alternatively, the first power source voltage V1 supplied to the first gamma voltage generator 242 of FIG. 5A may be higher than the first power source voltage V1 supplied to the second gamma voltage generator 244 of FIG. 5B and the second power source voltage V2 supplied to the second gamma voltage generator of FIG. 5B may also be higher than the second power source voltage V2 supplied to the third gamma voltage generator 246 of FIG. 5C. In this case, the lower second gamma voltages of the second gamma voltage set are superposed with the upper first gamma voltages of the first gamma voltage set and the upper second gamma voltages of the second gamma voltage set are superposed with the lower third gamma voltages of the third gamma voltage set. Because the second gamma voltage set in the middle level range is partially superposed with the first gamma voltage set in the low level range and the third gamma voltage set in the high level range, phoresis may be performed with respect to two kinds of particles of the first to third particles 222 to 226. Accordingly, the optical usability of the electronic ink panel 232 and the cleanness of the image may improve.

As mentioned above, the electronic ink panel allows one of the red, green, and blue particles to selectively perform the phoresis. Accordingly, the electronic ink panel may display the color image without a color filter. The electronic ink panel may be slimmer by removing the color filter and the manufacturing process may be simplified.

The red, green, and blue sub-pixel data voltages in different level ranges are supplied to the data lines of the electronic ink panel including the red, green, and blue particles responding to the voltages in different level ranges. One of the red, green, and blue colors of the gradation corresponding to the logic value of sub-pixel data is displayed by selectively performing phoresis with respect to only one kind of particles of the red, green, and blue particles on the electronic ink panel according to the sub-pixel. Consequently, the electronic ink display device and the method for driving the electronic ink display device may display the color image corresponding to the sub-pixel data stream of one frame on the electronic ink panel without a color filter. Because the electronic ink display device may have the thinner electronic ink panel, it may be slimmer and may be manufactured with a simplified process.

Although preferred embodiments have been shown and described, it would be appreciated by those skilled in the art that changes might be made in those embodiments without departing from the principles and spirit of the invention, the scope of which is defined in the claims and their equivalents.

We claim:

1. An electronic ink panel comprising:
    a first substrate having a first electrode; and
    a second substrate having a plurality of second electrode patterns which faces the first electrode wherein the second electrode patterns cover a pixel region; and
    an electronic ink layer interposed between the first and the second substrates and including a plurality of particles, each of the particles responding to a voltage in a different level range,
    wherein the particles comprise a first particle, a second particle and a third particle and the first, the second and the third particles have red, green, and blue colors, respectively,
    wherein the first particle perform phoresis toward the first electrode when a voltage of a first gamma voltage sets is applied between the first electrode and the second electrode patterns to display the red color of the gradation corresponding to the voltage,
    wherein the second particle perform phoresis toward the first electrode when a voltage of a second gamma voltage sets larger than the first gamma voltage sets is applied between the first electrode and the second electrode patterns to display the green color of the gradation corresponding to the voltage,
    wherein the third particle perform phoresis toward the first electrode when a voltage of a third gamma voltage sets larger than the second gamma voltage sets is applied between the first electrode and the second electrode patterns to display the blue color of the gradation corresponding to the voltage,
    wherein the first gamma voltage sets include a plurality of voltages with a low level range corresponding to the red particles, the second gamma voltage sets include a plurality of voltages with a middle level range corresponding to the green particles and the third gamma voltage sets include a plurality of voltages with a high level range corresponding to the blue particles.

2. An electronic ink panel according to claim 1, wherein the electronic ink layer comprises capsules and the first to third particles are injected into the capsules.

3. An electronic ink panel according to claim 2, wherein the capsule comprises a fluid where the first to third particles perform free phoresis and phoresis positions of the first to third particles is maintained in the fluid.

4. An electronic ink panel according to claim 1, wherein the second electrode patterns have the same size as that of a pixel region,
    wherein the electronic ink layer comprises a binder film, and the fluid divides the size of the second electrode patterns in the binder film.

5. An electronic ink panel according to claim 1, wherein the second substrate further comprises:
    gate lines for selecting the second electrode patterns by rows;
    data lines for supplying data voltages to the second electrode patterns by columns; and
    a switch device located at intersection between the gate lines and the data lines, the switch device operating to supply the data voltage to the second electrode pattern from the corresponding data line in response to a signal on the corresponding gate line.

6. An electronic ink display device comprising:
    an electronic ink panel including an electronic ink layer and substrates, the electronic ink layer comprising particles of red, green, and blue colors which perform phoresis in response to voltages in different level ranges and the substrates comprising wire patterns dividing and driving the electronic ink layer to sub-pixel regions;
    a gamma voltage generating section for generating first to third gamma voltage sets, the first to third gamma voltage sets having at least two gradation voltages in level ranges and corresponding to the red, green, and blue particles; and
    a driving unit for driving the wire patterns on the electronic ink panel so that one of the red, green, and blue particles performs phoresis in one of the sub-pixel regions using the first to third gamma voltage sets in response to a data steam wherein the data stream comprises sub-pixel data of red, green, and blue, wherein the first particle perform phoresis toward the first electrode when a voltage in a low level range is applied between the first electrode and the second electrode patterns to display the red color of the gradation corresponding to the voltage, wherein the second particle perform phoresis toward the first electrode when a voltage in a middle level range is applied between the first electrode and the second electrode patterns to display the green color of the gradation corresponding to the voltage, wherein the third particle perform phoresis toward the first electrode when a voltage in a high level range is applied between the first electrode and the second electrode patterns to display the blue color of the gradation corresponding to the voltage, wherein the first gamma voltage set comprises at least two voltages in a low level range, the second gamma voltage set comprises at least two voltages in a middle level range, and the third gamma voltage set comprises at least two voltages in a high level range.

7. An electronic ink display device according to claim 6, wherein the gamma voltage set of the first to third gamma voltage sets which occupies the middle level range comprises a gamma voltage of a gradation superposed with the other sets.

8. A method for driving an electronic ink display device, the method comprising:

generating first, second and third gamma voltage sets having at least two gradation voltages in different voltage level ranges;

inputting the first, the second and the third gamma voltage sets to a data driver;

converting at the data driver sub-pixel data of red, green, and blue in the form of a data stream to sub-pixel data voltages of red, green, and blue in the form of analog by using the first, the second and the third gamma voltage sets;

supplying the sub-pixel data voltages of red, green, blue to wire pattern which divides an electronic ink panel to the sizes of sub-pixel regions wherein the electronic ink panel comprises particles of red, green, and blue colors and the first, the second and the third gamma voltage sets have at least two gradation voltages in level ranges corresponding to the red, green and blue particles; and, performing phoresis of the red, green, and blue particles in response to voltages in different level ranges in the sub-pixel regions, wherein the performing phoresis comprises performing with the red particle phoresis with a voltage in a low level range, performing with the green particle phoresis with a voltage in a middle level range and performing with the blue particle phoresis with a voltage in a high level range, wherein generating the first, the second and the third gamma voltage sets comprises generating the first gamma voltage set which includes at least two voltages in a low level range, generating the second gamma voltage set which includes at least two voltages in a middle level range and generating the third gamma voltage set which includes at least two voltages in a high level range.

9. A method according to claim 8, further comprising:
superimposing one of the two voltages of the first gamma voltage set with one of the two voltages of the second gamma voltage set.

10. A method according to claim 8, further comprising:
superimposing one of the two voltages of the second gamma voltage set with one of the two voltages of the third gamma voltage set.

11. A method according to claim 8, wherein generating the first, the second and the third gamma voltage sets comprises generating a gamma voltage set which occupies a middle level range.

12. A method according to claim 11, wherein generating the gamma voltage set which occupies the middle level range comprises generating a gamma voltage of a gradation superimposed with the other sets.

* * * * *